United States Patent [19]

Hays

[11] 4,428,665

[45] Jan. 31, 1984

[54] APPARATUS, PROCESS FOR REMOVAL OF TONER PARTICLES

[75] Inventor: Dan A. Hays, Fairport, N.Y.

[73] Assignee: Xerox Corporation, Stamford, Conn.

[21] Appl. No.: 318,884

[22] Filed: Nov. 6, 1981

[51] Int. Cl.³ .............................. G03G 21/00
[52] U.S. Cl. ............................ 355/15; 118/652; 15/256.5; 355/77; 430/125
[58] Field of Search ............... 355/15, 77, 3 BE, 16; 118/652; 430/125; 15/256.51, 256.52, 256.5; 134/1, 6, 7

[56] References Cited

U.S. PATENT DOCUMENTS

| | | | |
|---|---|---|---|
| 2,911,330 | 11/1959 | Clark | 134/1 |
| 3,424,615 | 1/1969 | Eichorn et al. | 134/7 |
| 3,552,850 | 1/1971 | Royka et al. | 355/15 |
| 3,615,397 | 10/1971 | Dimond | 96/1.4 |
| 3,615,398 | 10/1971 | Caldwell | 96/1.4 R |
| 3,947,108 | 3/1976 | Thettu et al. | 355/15 |
| 3,950,089 | 4/1976 | Fraser et al. | 355/15 X |
| 4,108,546 | 8/1978 | Rezanka | 355/15 |
| 4,110,034 | 8/1978 | Suzuki | 355/15 |
| 4,127,327 | 11/1978 | Rezanka | 355/15 |
| 4,142,165 | 2/1979 | Miyakawa et al. | 355/15 X |
| 4,279,496 | 7/1981 | Silverberg | 355/3 BE |
| 4,279,499 | 7/1981 | Rezanka et al. | 355/15 |

Primary Examiner—Richard L. Moses
Attorney, Agent, or Firm—E. O. Palazzo

[57] ABSTRACT

The present invention is directed to a process and an improved apparatus for simultaneously removing and transporting undesirable residual insulating toner particles from a flexible imaging member comprising in operative relationship, a cleaning roll means containing on its surface insulating carrier particles, said cleaning roll being charged to a predetermined potential, a deflected flexible imaging member means containing residual insulating toner particles thereon, a cleaning zone encompassed by and situated between said cleaning roll means and said deflected flexible imaging member means, magnet means contained in the cleaning roll means, and magnetic strips contained in the outer periphery of said cleaning roll means.

10 Claims, 3 Drawing Figures

APPARATUS, PROCESS FOR REMOVAL OF TONER PARTICLES

BACKGROUND OF THE INVENTION

This invention relates generally to a system for removing undesirable toner particles from an imaging member, and more specifically, the present invention is directed to an apparatus and process for simultaneously removing, depositing, and transporting insulating toner particles contained in an electrostatographic imaging apparatus, which apparatus and process are simple in design, very efficient, and less costly than many prior art systems.

The development of images by electrostatic means is well known, one development method involving the application of toner particles to the electrostatic latent image to be developed utilizing a variety of development methods as described for example in U.S. Pat. No. 3,618,552, cascade development, magnetic brush development, U.S. Pat. Nos. 2,874,063, 3,251,706, and 3,357,402, powder cloud development U.S. Pat. No. 2,221,776, and touchdown development U.S. Pat. No. 3,166,432. Generally, in these systems, undesirable residual toner particles adhere to the imaging surface subsequent to the transfer of the developed image to a supporting substrate, such as paper. Systems are known for causing the removal of residual toner particles from imaging surfaces, which systems incorporate doctor blades and/or cleaning brushes. Such prior art systems are in some instances not only very complex and costly, but do not achieve the desired cleaning efficiency over extended periods of time. Also, there is disclosed in U.S. Pat. No. 3,580,673 an apparatus for cleaning toner particles from a recording surface, which apparatus includes a rotably mounted non-magnetic cylinder member housing, and a permanent bar magnet. The cylindrical member moves magnetic beads into contact with the recording surface, and an electrical bias opposite in polarity to the polarity of the toner particles is applied thereto, which electrical bias is sufficient to attract toner particles to the cleaning beads. Subsequently the toner particles are removed from the cleaning beads by a detoning roller biased to a polarity opposite to the polarity on the toner particles; with toner removal from the detoning roller being accomplished by mechanical detachment employing for example a doctor blade.

Further, there is disclosed in U.S. Pat. No. 3,713,736 a toner removal apparatus including a container partially filled with magnetizible particles. A hollow cleaning roller is secured in the container so as to allow for its rotation about a permanent magnet, wherein toner particles clinging to the photoconductive surface are attracted by triboelectric forces to the magnetizable particles on the surface of the cleaning roller.

There is also known other different cleaning devices for the purpose of removing unwanted residual toner particles, including for example web devices, foam rollers, combinations thereof, and the like. Each of these prior art devices has disadvantages primarily relating to their inability to satisfactorily and efficiently remove residual toner particles over extended periods of time from the imaging surface, in a simple and economical manner. Prior art systems which can be complex, costly, and/or may require improvement in their cleaning efficiency include those described in U.S. Pat. No. 2,911,330 on magnetic brush cleaning, as well as those systems described in U.S. Pat. No. 3,947,108 wherein there is disclosed the removal of toner particles by a scrubbing of the imaging surface, and U.S. Pat. No. 4,108,546 wherein magnetic attraction is employed as an aid in removing magnetic toner particles from an imaging surface.

Accordingly, there continues to be a need for an improved apparatus and process for efficiently and effectively removing toner particles from an imaging member, and simultaneously transporting such particles to a cleaning member, the process retaining its effectiveness over extended periods of time. Additionally, there is a need for an improved toner cleaning system, wherein residual toner particles can be returned to a toner supply reservoir.

SUMMARY OF THE INVENTION

It is a feature of the present invention to provide an improved apparatus and process which overcomes the above-noted disadvantages.

A further feature of the present invention is the provision of an improved apparatus and process which simultaneously removes, and transports residual toner particles from a flexible imaging member to a cleaning member.

In another feature of the present invention there is provided an improved apparatus and process for simultaneously removing and conveying residual toner particles from a flexible imaging member to a cleaning member, followed by the removal of such particles from the cleaning member.

These and other features of the present invention are generally accomplished by the provision of a system for simultaneously removing, and transporting insulating toner particles from a flexible imaging member which comprises (1) a cleaning roll containing on its surface insulating carrier particles, (2) a flexible imaging member deflected in an arc, causing the formation of a cleaning zone encompassed by the cleaning roll and the flexible member, (3) a cleaning roll actuated in a manner insulating carrier particles to contact insulating residual toner particles present on the flexible imaging member, thereby removing said toner particles from said flexible imaging member, and depositing the removed toner particles on the cleaning roll, (4) transporting the removed toner particles on the cleaning roll, (5) removing the insulating carrier particles from the cleaning roll, (6) removing the insulating toner particles from the cleaning roll, which toner particles can be directed to a reservoir, (7) followed by directing and returning the removed insulating carrier particles to the cleaning roll. The residual toner particles removed from the flexible imaging member migrate through the carrier particles contained in the cleaning zone, and deposit on the cleaning roll which is rotating. Accordingly, in accordance with the present invention residual toner particles remaining on a flexible imaging member subsequent to development are removed therefrom, and deposited and transported on a cleaning roll, thus eliminating for example, the need for a separate detoning roll, or detoning step as is utilized in present magnetic brush cleaning systems.

The present invention, in one embodiment, is directed to an apparatus for simultaneously removing and transporting undesirable residual insulating toner particles from a flexible imaging member comprising in operative relationship, a cleaning roll means containing on its surface insulating carrier particles, said cleaning roll being charged to a predetermined potential by for example, a voltage source, a deflected flexible imaging member means containing residual insulating toner particles thereon, a cleaning zone encompassed by and situated between said cleaning roll means and said deflected flexible imaging member means, magnet means contained in the cleaning roll means, magnetic strips contained in the outer periphery of said cleaning roll means, a doctor blade means, and optionally a toner auger means, wherein as a result of movement of the cleaning roll means and the flexible deflected imaging member means, residual toner particles are attracted to said roller means.

In another embodiment, the present invention is directed to a process for simultaneously removing, and transporting insulating toner particles from a flexible imaging member which comprises (1) providing a cleaning roll containing on a portion of its surface insulating carrier particles, which cleaning roll contains therein magnets, and magnetic strips, (2) providing a moving flexible imaging member deflected in an arc, wherein there results a cleaning zone encompassed by, and situated between the cleaning roll and the deflected flexible imaging member, (3) actuating the cleaning roll causing the insulating carrier particles to contact the insulating residual toner particles contained on the moving deflected flexible imaging member, (4) removing the residual toner particles from the deflected flexible imaging member as a result of said contact, (5) depositing the removed toner particles on the cleaning roll, (6) transporting the removed particles on the cleaning roll, (7) removing the insulating carrier particles, (8) removing the insulating toner particles, and (9) subsequently redirecting the removed insulating carrier particles to the cleaning roll.

Also embraced within the present invention is an improved electrostatographic imaging apparatus comprising a charging means, an imaging means, a development means, a fusing means, a fixing means and a cleaning means, the improvement residing in the cleaning means which comprises in operative relationship a cleaning roll means containing on its surface insulating carrier particles, said cleaning roll being charged to a predetermined potential by for example, a voltage source, a deflected flexible imaging member means, containing residual insulating toner particles thereon, a cleaning zone encompassed by and situated between said cleaning roll means and said deflected flexible imaging member means, magnet means contained in the cleaning roll means, magnetic strips contained in the outer periphery of said cleaning roll means, a doctor blade means, and optionally a toner auger means, wherein as a result of movement of the cleaning roll means and the flexible deflected imaging member means, residual toner particles are attracted to said roller means.

DESCRIPTION OF THE PREFERRED EMBODIMENTS

The present invention and various alternative embodiments thereof will now be described with reference to the Figures wherein.

Figure 1:
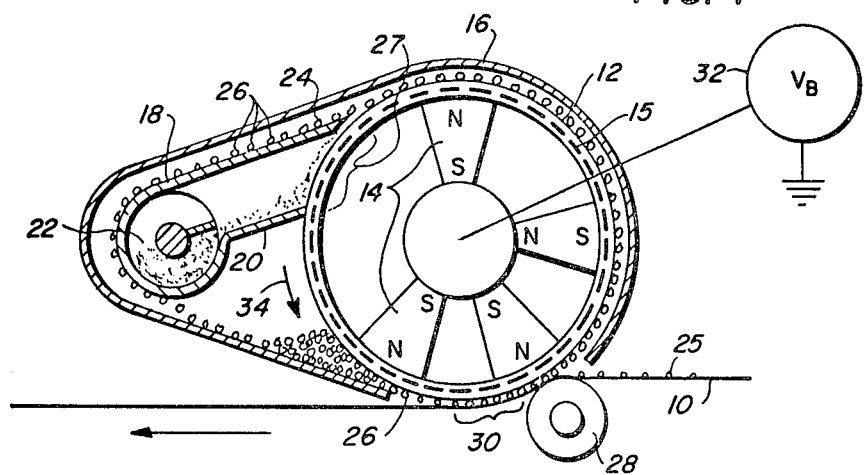
FIG. 1 is a schematic view illustrating the cleaning system, apparatus and process, of the present invention.

Illustrated in FIG. 1 is the cleaning system, apparatus and process, of the present invention, comprised of a deflected flexible imaging means 10, cleaning roll means 12 containing therein magnets 14, and magnetic strips 15, a shroud means 16, a baffle means 18, a doctor blade means 20, a toner auger means 22, insulating removed residual toner particles 24, residual toner particles 25, insulating carrier particles 26, removal zone 27, an idler roll means 28, a cleaning zone 30, and a voltage source means 32. In one sequence of operation, cleaning roll means 12, which is biased to a polarity opposite to the polarity of the residual toner particles, and contains cylindrical magnets 14, and magnetic strips 15, is caused to move in the direction illustrated by the arrow by a motor (not shown) which movement causes insulating carrier particles 26, adhering to the roll means 12 to contact the residual insulating toner particles 25 contained on the deflected flexible imaging means 10, which is moving in the direction illustrated by the arrow. As a result, the insulating carrier particles 26 remove the residual insulating toner particles 25 in a cleaning zone or nip designated 30, which is formed as a result of the deflection of the flexible imaging means 10, in an arc ranging from about 5 degrees to about 50 degrees, this deflection being caused primarily by the pressure exerted by the insulating carrier particles 26, and a tensioning means, not shown. Primarily because of electrostatic forces, the insulating toner particles are attracted to and deposited on the insulating carrier particles, and are transported away from the flexible imaging means 10. The electrostatic force on the residual toner particles is caused by the electrical forces present on the cleaning roll acting on charged residual toner particles, which charge can be increased by triboelectric charging between the toner and carrier particles in the cleaning zone. Such electrostatic forces assists in causing removal of the residual toner particles 25 from the imaging member 10, and allows for the migration of toner particles through the carrier particles 26 on the cleaning roll 12. The rate of toner migration through the carrier particles is increased by carrier particle agitation in the cleaning zone 30, which agitation is caused by the relative motion between the arced flexible imaging member 10, and the cleaning roll 12 containing carrier particles thereon. Increased agitation is obtained when the cleaning zone contains a weak magnetic field and a thin spacing between the imaging member 10 and roll 12. Carrier particle agitation, electrostatic forces and toner migration through the carrier particles causes the residual toner particles 25 (1) to be removed from the flexible imaging member 10, (2) to migrate through the agitated carrier particles 26, and (3) to be deposited on the cleaning roll 12. Continuous rotation of the cleaning roll means 12 provides for removal of the insulating carrier particles in region 27 wherein there resides a weak magnetic field, that is, no internal magnets 14 exist in this region. The removed carrier particles are directed by baffle means 18 to the cleaning roll means 12 for redeposition thereon. Subsequently, residual toner particles 25 are removed by a doctor blade means 20 and directed to a reservoir containing a toner auger means 22. The toner auger means 22 transports the removed toner particles to a toner supply reservoir for reuse, or alternatively the toner particles can be transported to a retention reservoir not shown, and subsequently removed from the apparatus.

Figure 2:
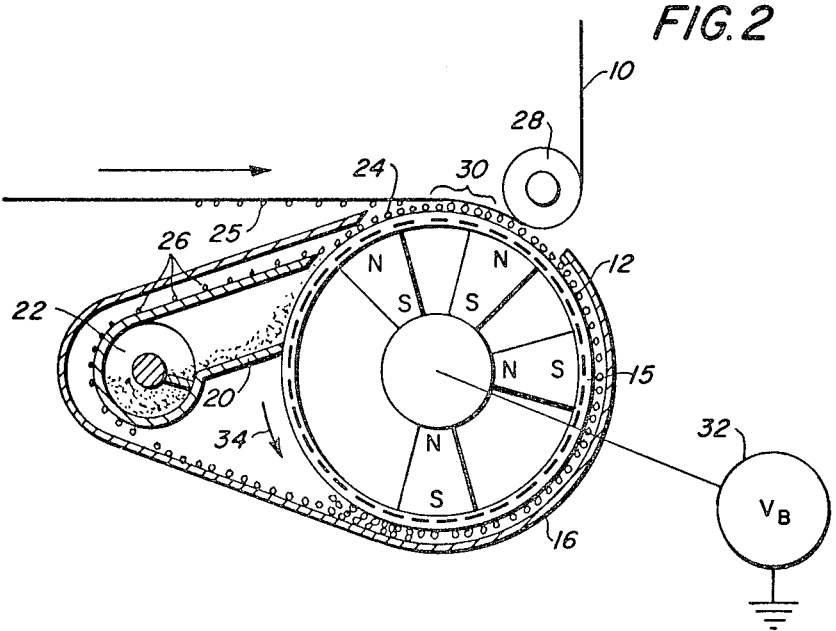
FIG. 2 is a schematic view of a further embodiment of the cleaning system, apparatus and process of the present invention.

Illustrated in FIG. 2 is a further embodiment of the present invention wherein the relationship between the flexible imaging member means 10, and the cleaning roll means 12 is as shown, thus the flexible imaging means 10 is contained at the top portion of the cleaning roll means 12 as compared to the bottom portion as illustrated in FIG. 1. In FIG. 2 like numerals represent the same components as shown in FIG. 1, thus there is illustrated in FIG. 2 a deflected flexible imaging member means 10, a cleaning roll means 12, containing therein magnets 14, magnetic strips 15, a shroud means 16, a baffle means 18, a doctor blade means 20, a auger means 22, insulating toner particles 24, residual toner particles 25, insulating carrier particles 26, removal region 27, idler roll means 28, a cleaning zone area 30, and a voltage source means 32, with the components moving in the direction as illustrated by the arrows. Operation of the embodiment of FIG. 2 is substantially identical to the operation of the embodiment illustrated in FIG. 1.

Of importance with reference to the process and apparatus of the present invention in addition to the utilization of the cleaning roll means 12, containing insulating carrier particles 26 thereon, is the area of contact, or cleaning zone 30, situated between the insulating carrier particles 26 and the insulating toner particles 25 contained on the flexible imaging means 10, which area is formed by causing the flexible imaging member means 10 to deflect, primarily by the pressure exerted by the insulating carrier particles. This deflection creates an area of contact between the carrier particles 26 and the toner particles 25, and allows the toner particles to be attracted and deposited on the cleaning roll means. Generally, the length of zone 30 ranges from about 0.5 centimeters to about 5 centimeters, with a preferred length being between about 1 centimeter and 2 centimeters, although lengths outside these ranges can be utilized providing the objectives of the present invention are accomplished.

Also of importance with regard to the removal and maintenance of the undesirable toner particles on the cleaning roll means 12 are the magnetic strips 15, which strips can be dispersed in a polymer matrix, and become magnetized in the presence of the field generated by the internal fixed magnets 14. The magnetizable strips are preferably comprised of steel strips in a thickness of about 0.012 inches, and in a width of about $\frac{1}{8}$ of an inch, these strips being embedded into a polymer material such an epoxy resin, which in turn is attached to the cleaning roll means 12. The strips have a distance therebetween of about $\frac{1}{8}$ of an inch and are contained in the cleaning roll means 12 around the entire periphery, as illustrated.

The potential applied to the cleaning roll means 12 by voltage source means 32 also assists in attracting and maintaining the toner particles on the cleaning roll means 12, this potential ranging from about −100 volts to about −800 volts, and preferably from a −300 volts to a −400 volts when positively charged toner particles are being attracted to the cleaning roll means 12.

The core of the cleaning roll means 12 which can be comprised of a number of known materials, such as aluminum, has a diameter of from about 1 inch to about 5 inches, and preferably has a diameter of from about 1 inch to about 3 inches, with a very preferred diameter of about 1.5 inches.

Generally the speed of the flexible imaging means 10 ranges from about 5 cm/sec to about 50 cm/sec, with the speed of the cleaning roll means 12 ranging from about 6 cm/sec to about 100 cm/sec, the relative movement of these members causing the insulating toner particles to be simultaneously removed, deposited and transported as indicated hereinbefore. Additionally, in one aspect of the present invention, wherein more than one layer of insulating carrier particles are present in zone 30, the movement of the cleaning roll means 12 and the flexible deflected imaging means 10, at the speeds indicated, causes a shearing or agitating action in the cleaning zone, wherein toner particles are caused to migrate from the flexible imaging means surface to the cleaning roll 12 as a result an electrical bias on the cleaning roll 12, and the rotation of the carrier particles in one direction then subsequently in another direction, which agitation, and rotation is increased when the magnetic field is low, for example less than 200 gauss. Thus, the insulating toner particles are removed from the flexible imaging member, and caused to migrate through a developer layer contained in the cleaning zone encompassed by the cleaning roll means 12 and the flexible imaging means 10, causing toner particles to be deposited on the cleaning member.

Figure 3:
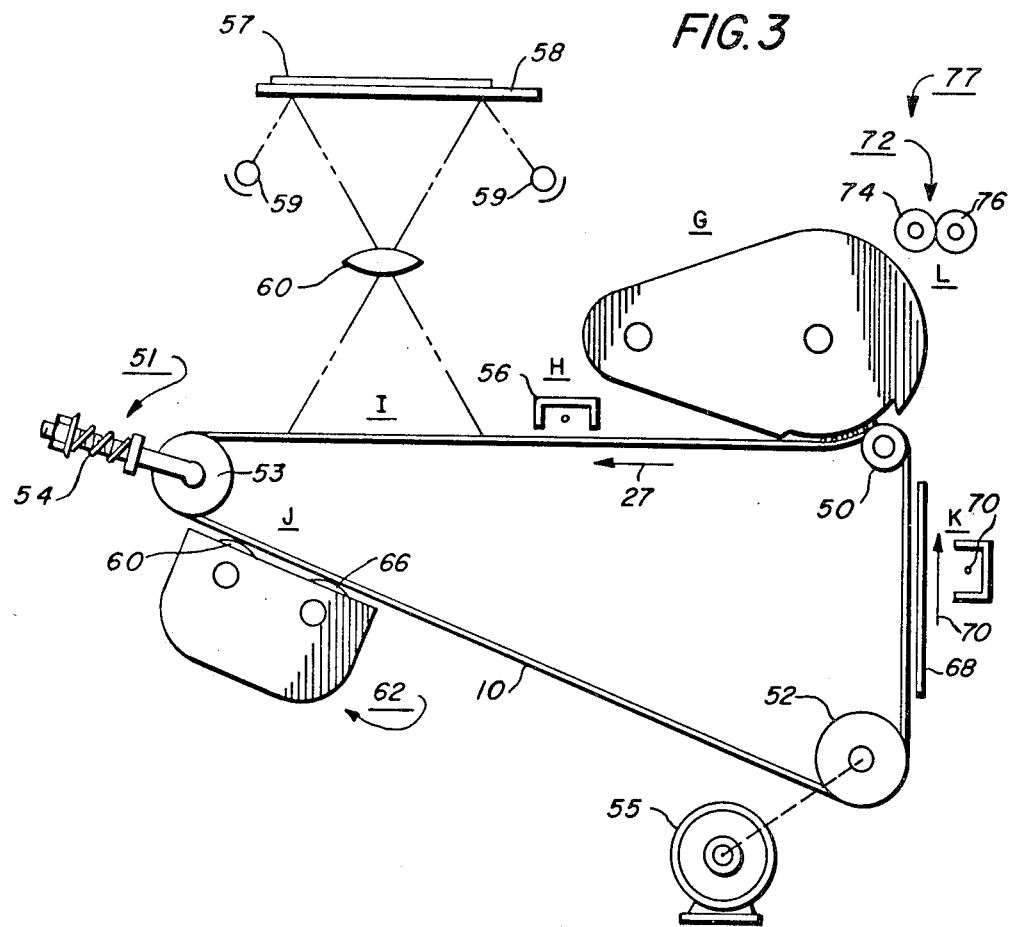
FIG. 3 is a schematic view illustrating an electrophotographic printing machine incorporating the cleaning system, process and apparatus, of the present invention.

The apparatus and process of the present invention are useful in many systems including electronic printers and electrostatographic machines, such as those employing xerographic systems well known in the art. In FIG. 3 there is illustrated a xerographic imaging system employing an imaging member means 10, equivalent to the means 10 of FIGS. 1 and 2. In this embodiment of the present invention, the imaging member 10 can be comprised of a substrate overcoated with a transport layer containing small molecules of N,N,N',N'-tetraphenyl-[1,1'-biphenyl]4-4'diamine, or similar diamines dispersed in a polycarbonate, which in turn is overcoated with a generating layer of trigonal selenium. Imaging member 10 moves in the direction of arrow 27 to advance successive portions of the imaging member sequentially through the various processing stations disposed about the path of movement thereof. The imaging member is entrained about a sheet-stripping roller 50, tensioning means 51, and drive roller 52. Tensioning means 51 includes a roller 53 having flanges on opposite sides thereof to define a path through which member 10 moves, with roller 53 being mounted on each end of guides attached to springs. Spring 54 is tensioned such that roller 53 presses against the imaging member 10. In this manner, member 10 is placed under the desired tension. The level of tension is relatively low permitting member 10 to be easily deformed. With continued reference to FIG. 1, drive roller 52 is mounted rotatably and in engagement with member 10. Motor 55 rotates roller 52 to advance member 10 in the direction of arrow 27. Roller 52 is coupled to motor 55 by suitable means such as a belt drive. Sheet-stripping roller 50 is freely rotatable so as to readily permit member 10 to move in the direction of arrow 27 with a minimum of friction.

Initially, a portion of imaging member 10 passes through charging station H. At charging station H, a corona generating device, indicated generally by the reference numeral 56, charges the photoconductive surface of imaging member 10 to a relatively high, substantially uniform potential.

The charged portion of the photoconductive surface is then advanced through exposure station I. An original document 57 is positioned face down upon transparent platen 58. Lamps 59 flash light rays onto original document 57, and the light rays reflected from original document 57 are transmitted through lens 60 forming a light image thereof. Lens 60 focuses the light image onto the charged portion of the photoconductive surface to selectively dissipate the charge thereon. This records an electrostatic latent image on the photoconductive surface which corresponds to the informational areas contained within original document 57.

Thereafter imaging member 10 advances the electrostatic latent image recorded on the photoconductive surface to development station J. At development station J, a magnetic brush development system, indicated generally by the reference numeral 62, advances a developer material into contact with the electrostatic latent image recorded on the imaging member. Developer rollers 60 and 66 transport a brush of developer material into contact with imaging member 10. The electrostatic latent image attracts the toner particles from the carrier granules forming a toner powder image on the photoconductive surface of member 10.

Imaging member 1 then advances the toner powder image to transfer station K. At transfer station K, a sheet of support material 68 is moved into contact with the toner powder image. The sheet of support material 68 is advanced to transfer station K by a sheet feeding apparatus (not shown). Preferably, the sheet feeding apparatus includes a feed roll contacting the uppermost sheet of a stack of sheets. The feed roll rotates so as to advance the uppermost sheet from the stack into a chute. The chute directs the advancing sheet of support material into contact with the photoconductive surface of member 10 in a timed sequence in order that the toner powder image developed thereon contacts the advancing sheet of support material at transfer station K.

Transfer station K includes a corona generating device 70 which sprays ions onto the backside of sheet 68. This attracts the toner powder image from the photoconductive surface to sheet 68. After transfer, sheet 68 moves in the direction of arrow 70 onto a conveyor (not shown) which advances sheet 68 to fusing station L.

Fusing station L includes a fuser assembly, indicted generally by the reference numeral 77, which permanently affixes the transferred toner powder image to sheet 68. Preferably, fuser assembly 72 includes a heated fuser roller 74 and a back-up roller 76. Sheet 68 passes between fuser roller 74 and back-up roller 76 with the toner powder image contacting fuser roller 74. In this manner, the toner powder image is permanently affixed to sheet 68. After fusing, a chute guides the advancing sheet 68 to a catch tray for subsequent removal from the printing machine by the operator.

Subsequent to the separation of the sheet of material from the photoconductive surface of imaging member 10 there remains residual toner particles adhering thereto which particles can be cleaned from the flexible imaging member surface at cleaning station G. Cleaning station G preferably includes the cleaning apparatus of FIG. 1, which comprises a cleaning roll means 12, containing magnets therein 14, magnetic strips 15, a shroud means 16, a baffle means 18, a doctor blade means 20, a toner auger means 22, removal zone 27, an idler roll means 28, a cleaning zone area 30, and voltage source 32. The cleaning roll means 12 as a result of its rotation presents insulating carrier particles contained thereon to the flexible imaging member means surface 10 containing thereon residual insulating toner particles 25, the cleaning zone 30 being formed as a result of the imaging member being deflected. As a result of the movement of the flexible imaging member and the cleaning roll, and in view of the deflection of the flexible imaging member, toner particles are removed from the imaging surface and deposited on the cleaning roll. The details of operation and components of the cleaning mechanism are as referenced herein with regard to FIGS. 1 and 2, and the accompanying explanation.

Illustrative examples of flexible image bearing member 10, include inorganic photoresponsive materials deposited on a flexible substrate such materials including, for example, amorphous selenium, selenium alloys, including alloys of selenium-tellurium, selenium arsenic, selenium antimony, selenium-tellurium-arsenic, cadmium sulfide, zinc oxide; and flexible organic photoresponsive materials such as, polyvinylcarbazole, layered organic photoreceptors, such as those containing a substrate overcoated with injecting contact, comprised of carbon dispersed in a polymer, overcoated with a transport layer, which in turn is overcoated with a generating layer, and finally an overcoating of an insulating organic resin, reference U.S. Pat. No. 4,251,612, and layered photoresponsive members comprised of a substrate, overcoated with a charge transport layer, which in turn is overcoated with a charge generating layer, reference U.S. Pat. No. 4,265,990, and the like.

Other organic photoresponsive materials that may be employed in a flexible configuration include, 4-dimethylamino-benzylidene, 2-benzylideneamino-carbazole, 4-dimethylamino-benzylidene, benzhydrazide; 2-benzylideneamino-carbazole, polyvinyl carbazole; (2-nitrobenzylidene)-p-bromo-aniline; 2,4-diphenyl quinazoline; 1,2,4-triazine; 1,5-diphenyl-3-methyl pyrazoline 2-(4'-dimethyl-amino pheny)benzoxazole; 3-amino-carbazole; polyvinylcarbazoletrinitrofluorenone charge transfer complex; phthalocyanines, layer photoresponsive devices containing injecting, transport and generating layers, or transport and generating layers, and the like.

By flexible imaging member as used herein is meant, generally, a material that can be deformed, such as the members disclosed in U.S. Pat. No. 4,265,990. In contrast, a rigid imaging member cannot be easily deflected, such members being hard or stiff, like amorphous selenium, which has not been deposited on a flexible substrate.

The flexible imaging member of the present invention is deflected in an arc of from about 5 degrees to about 50 degress.

The developer composition utilized in the electrostatographic imaging device of the present invention is comprised of insulating toner particles, (resin plus colorant or pigment) and insulating magnetic carrier particles. By insulating as used herein is meant non-conducting, that is, for example, charge does not tend to flow from the image bearing member to the ends of the carrier particles near the cleaning member. Illustrative examples of toner resins that may be utilized include polyamides, epoxies, polyurethanes, vinyl resins and polymeric esterification products of a dicarboxylic acid and a diol comprising a diphenol. Any suitable vinyl resin may be employed as the toner resin including homopolymers or copolymers of two or more vinyl monomers. Typical of such vinyl monomeric units include: styrene, p-chlorostyrene vinyl naphthalene, ethylenecally unsaturated monoolefins such as ethylene, propylene, butylene, isobutylene and the like; vinyl esters such as vinyl chloride, vinyl bromide, vinyl fluoride, vinyl acetate, vinyl propionate, vinyl benzoate, vinyl butyrate and the like; esters of alphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methylalphachloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinyldene halides such as vinylidene chloride, vinylidene chlorofluoride and the like; and N-vinyl indole, N-vinyl pyrrolidene and the like; and mixtures thereof.

Also esterification products of a dicarboxylic acid and a diol comprising a diphenol may be used as a preferred resin material for the toner composition of the present invention. These materials are illustrated in U.S. Pat. No. 3,655,374, totally incorporated herein by reference, the diphenol reactant being of the formula as shown in column 4, beginning at line 5 of this patent and the dicarboxylic acid being of the formula as shown in column 6 of the above patent.

The resin is present in an amount so that the total of all ingredients used in the toner total about 100%, thus when 5% by weight of an alkyl pyridinium compound is present as described hereinafter, and 10% by weight of pigment such as carbon black is present, about 85% by weight of toner resin material is present. The toner resin particles can vary in diameter, but generally range from about 5 microns to about 30 microns in diameter, and preferably from about 10 microns to about 20 microns.

Any suitable pigment or dye may be employed as the colorant for the toner particles, such materials being well known and including for example, carbon black, nigrosine dye, aniline blue, calco oil blue, chrome yellow, ultramarine blue, DuPont oil red, methylene blue chloride, phthalocyanine blue and mixtures thereof. The pigment or dye should be present in sufficient quantity to render it highly colored so that it will form a clearly visible image on the recording member. For example, where conventional xerographic copies of documents are desired, the toner may comprise a black pigment such as carbon black or a black dye such as Amaplast black dye available from the National Aniline Products Inc. Preferably the pigment is employed in amounts from about 3% to about 20% by weight based on the total weight of toner, however, if the toner color employed is a dye, substantially smaller quantities of the color may be used.

Additionally, there can be incorporated in the toner (resin plus colorant) various charge control agents primarily for the purpose of imparting a positive charge to the toner resin. Examples of charge control agents includes quaternary ammonium compounds as described in U.S. Pat. No. 3,970,571, and alkyl pyridinium halides such as cetyl pyridinium chloride, described in copending application U.S. Ser. No. 205,950, filed on May 12, 1978.

Various suitable insulating magnetic carrier materials can be employed as long as such particles are capable of triboelectrically obtaining a charge of opposite polarity to that of the toner particles. In the present invention in one embodiment that would be a negative polarity, to that of the toner particles which are positively charged so that the toner particles will adhere to and surround the carrier particles. Illustrative examples of carrier particles include steel, nickel, iron ferrites, magnetites and the like. The carriers can be used with or without a coating, examples of coatings including fluoropolymers such as polyvinylidene fluoride, methyl terpolymers and the like. Also nickel berry carriers as described in U.S. Pat. Nos. 3,847,604 and 3,767,598 can be employed, these carriers being nodular carrier beads of nickel characterized by surface of reoccurring recesses and protrusions providing particles with a relatively large external area. Preferably the carrier particles, or their cores are comprised of materials that allow dissipation of net charge accumulation resulting from the development process, such as for example steel shot carriers. The diameter of the carrier particles ranges from about 50 to about 1,000 microns, thus allowing the carrier to possess sufficient density and inertia to avoid adherence to the electrostatic images during the development process.

Other modifications of the present invention will occur to those skilled in the art based upon a reading of the present disclosure. These are intended to be included within the scope of the present invention.

I claim:

1. A process for simultaneously removing, and transporting insulating toner particles from a flexible imaging member which comprises (1) providing a cleaning roll containing on a portion of its surface insulating carrier particles, which cleaning roll contains therein magnets, and magnetic strips, (2) providing a moving flexible imaging member deflected in an arc, wherein there results a cleaning zone encompassed by and situated between the cleaning roll and the deflected flexible imaging member, which member consists essentially of a substrate, a photogenerating layer, and an amine transport layer, (3) actuating the cleaning roll causing the insulating carrier particles to contact he insulating residual toner particles contained on the deflected moving flexible imaging member (4) removing the residual toner particles from the deflected flexible imaging member as a result of said contact, (5) depositing the removed toner particles on the cleaning roll, (6) transporting the removed toner particles on the cleaning roll, (7) removing the insulating carrier particles, (8) removing the insulating toner particles, (9) and subsequently redirecting the removed insulating carrier particles to the cleaning roll, wherein the flexible imaging member is deflected in an arc of from about 5 degrees to about 50 degrees.

2. A process in accordance with claim 1 wherein the deflected flexible imaging member is moving at a speed of from about 5 cm/sec to about 50 cm/sec, the cleaning roll is moving at a speed of from about 6 cm/sec to about 100 cm/sec, the insulating carrier particles being removed from the roll as a result of the absence of a magnetic field, and the insulating toner particles being removed from the cleaning roll by a doctor blade.

3. A process in accordance with claim 1 wherein the flexible imaging member is maintained at a preselected tension of sufficient magnitude causing said member to deflect in an arc ranging from about 5 degrees to about 30 degrees thereby creating an extended cleaning zone between the cleaning roll and the flexible imaging member.

4. An improved electrostatographic imaging apparatus comprising a charging means, an imaging means, a development means, a fusing means, a fixing means and a cleaning means, the improvement residing in the cleaning means which comprises in operative relationship a cleaning roll means containing on its surface insulating carrier particles, said cleaning roll being charged to a predetermined potential, a deflected flexible imaging member, which member consists essentially of a substrate, a photogenerating layer, and an amine transport layer, containing residual insulating toner particles thereon, a cleaning zone encompassed by and situated between said cleaning roll means and said deflected flexible imaging member means, magnet means contained in the cleaning roll means, and magnetic strips contained in the outer periphery of said cleaning roll means, wherein said apparatus further includes a doctor blade means and a shroud means, and wherein as a result of movement of the cleaning roll means and deflected flexible imaging member means, residual toner particles are attracted to and deposited on the cleaning roll means.

5. An improved apparatus in accordance with claim 4 wherein the flexible imaging member is deflected in the form of an arc of from about 5 degrees to about 50 degrees.

6. An apparatus in accordance with claim 5 wherein the flexible imaging member is comprised of a substrate, overcoated with a transport layer, and an overcoating generating layer.

7. An apparatus in accordance with claim 5 wherein the flexible imaging member is located below the cleaning roll means.

8. An apparatus in accordance with claim 5 wherein the flexible imaging member is located above the cleaning roll means.

9. An apparatus in accordance with claim 5 wherein the length of the cleaning zone is from about 0.5 centimeters to about 5 centimeters.

10. An apparatus in accordance with claim 4 wherein the insulating carrier particles are removed by a shroud means, and redeposited on the roller means.

* * * * *